US012712914B2

(12) United States Patent
Parla et al.

(10) Patent No.: US 12,712,914 B2
(45) Date of Patent: Aug. 18, 2026

(54) USING NON-ROUTABLE ADDRESSING TO REDUCE ATTACK SURFACE IN SECURE ACCESS SYSTEMS

(71) Applicant: Cisco Technology, Inc., San Jose, CA (US)

(72) Inventors: Vincent E. Parla, North Hampton, NH (US); Andrzej Konrad Kielbasinski, Grafton, MA (US); Valentiu Vlad Santau, Littleton, MA (US); Peter S. Davis, Wakefield, MA (US)

(73) Assignee: Cisco Technology, Inc., San Jose, CA (US)

( * ) Notice: Subject to any disclaimer, the term of this patent is extended or adjusted under 35 U.S.C. 154(b) by 188 days.

(21) Appl. No.: 18/368,421

(22) Filed: Sep. 14, 2023

(65) Prior Publication Data

US 2024/0396938 A1 Nov. 28, 2024

Related U.S. Application Data

(60) Provisional application No. 63/469,225, filed on May 26, 2023.

(51) Int. Cl.
*H04L 9/40* (2022.01)
*H04L 61/4511* (2022.01)

(52) U.S. Cl.
CPC ...... *H04L 63/1491* (2013.01); *H04L 61/4511* (2022.05); *H04L 63/0876* (2013.01); *H04L 63/20* (2013.01)

(58) Field of Classification Search
CPC . H04L 63/1491; H04L 63/0876; H04L 63/20; H04L 61/4511; H04L 61/2514
See application file for complete search history.

(56) References Cited

U.S. PATENT DOCUMENTS 9,954,902 B1 4/2018 Sethi
11,005,919 B2 * 5/2021 Chauhan ............... H04L 63/102
(Continued)

FOREIGN PATENT DOCUMENTS

CN 115189897 A 10/2022
WO WO-2023017382 A1 * 2/2023 ......... A41D 13/0158
WO 2024155389 A1 7/2024

OTHER PUBLICATIONS

International Search Report and Written Opinion for International Application No. PCT/US2024/030428, mailed Aug. 27, 2024, 16 Pages.

*Primary Examiner* — Khoi V Le
(74) *Attorney, Agent, or Firm* — Lee & Hayes, P.C.

(57) ABSTRACT

Techniques for a client device configured with a kernel driver framework (KDF) to establish connection(s) with target workload(s) provisioned in remote network(s) (e.g., an enterprise network) using non-routable synthetic IP address(es) (e.g., a loopback address within a link-local address range, a unique local address within a discard prefix range, and/or the like). The KDF may intercept DNS requests from application(s) executing on a client device, generate and return a synthetic IP address associated with a given domain in the DNS request, and establish a connection with a secure access gateway using the non-routable synthetic IP address. Additionally, the KDF may invoke an external browser with an authentication redirect to a randomly generated synthetic IP address on a randomly generated port, where a local listener on a client device may listen on the synthetic IP address and random port to obtain and/or store authentication data for later use.

20 Claims, 8 Drawing Sheets

(56) References Cited

U.S. PATENT DOCUMENTS

| | | | | |
|---|---|---|---|---|
| 2009/0043900 | A1* | 2/2009 | Barber | H04L 61/4511 709/228 |
| 2014/0040343 | A1* | 2/2014 | Nickolov | H04L 67/101 709/201 |
| 2016/0218978 | A1* | 7/2016 | Lapidous | H04L 67/563 |
| 2016/0234186 | A1* | 8/2016 | Leblond | H04L 67/34 |
| 2017/0171232 | A1 | 6/2017 | Graham-Cumming | |
| 2017/0331789 | A1* | 11/2017 | Kumar | H04L 63/0272 |
| 2019/0386961 | A1 | 12/2019 | Kupisiewicz et al. | |
| 2022/0210173 | A1 | 6/2022 | Katmor et al. | |
| 2023/0017382 | A1 | 1/2023 | Li et al. | |
| 2024/0305566 | A1* | 9/2024 | Jaiswal | H04L 45/76 |

* cited by examiner

USING NON-ROUTABLE ADDRESSING TO REDUCE ATTACK SURFACE IN SECURE ACCESS SYSTEMS

CROSS REFERENCE TO RELATED APPLICATIONS

This application claims priority to U.S. Provisional Patent Application No. 63/469,225, filed May 26, 2023, the entire contents of which are incorporated herein by reference.

TECHNICAL FIELD

The present disclosure relates generally to using non-routable addressing to reduce attack surface in secure access systems.

BACKGROUND

Service providers offer computing-based services, or solutions, to provide users with access to computing resources to fulfill users' computing resource needs without having to invent in and maintain computing infrastructure required to implement the services. For example, cloud service providers may operate networks of data centers housing significant numbers of interconnected computing systems, such as public data centers, that are configured by the service provider to provide cloud-based services to users (or "customers"). These service provider networks may provide network-based computing resources on an as-needed basis. For example, a service provider network may permit users to purchase and utilize computing resources such as virtual machine ("VM") instances, compute resources, data storage resources, database resources, networking resources, network services, and other types of computing resources. Users may configure the computing resources provided by a service provider network to implement desired functionality, such as to provide a network-based application or another type of functionality to an enterprise of users. While hyperscaler-based datacenters are growing in popularity, traditional enterprise-managed datacenters are still widely used. The combination of these deployments is usually described as 'hybrid' datacenters. Generally, remote users are able to connect to these network-based, enterprise, and/or private workloads using secure access solutions, such, as, for example, virtual private networks (VPN), zero trust network access (ZTNA), secure shell (SSH), remote desktop protocol (RDP), and/or the like.

However, such secure access solutions typically rely on domain name system (DNS) assigned addresses to connect to private workloads (also referred to herein as resources). DNS has the benefit of allowing a name to dynamically map to an address that might change over time. For example, in cloud-native ecosystems, a workload may move to a different internet protocol (IP) address in a pool as the result of a load-balancing and/or resource balancing action(s). DNS load-balancing technologies are another example of how the IP address can be ephemeral and change due to round-robin and/or other algorithms used. The outcome is typically a small number of possible IP addresses in a range of addresses from a pool. Often times, the address is from a range of service IP addresses assigned specifically for that resource. This is typically a small range of possible IP addresses for a given workload that will be used to 'service' that resource. This is very common in a environments the IP address of the workload itself is exposed externally as a 'service IP', such as, in Kubernetes, for example.

In ZTNA solutions, a technique is used to obfuscate the real IP address of the workload by using a network address translation (NAT) function between the endpoint and the workload. This is typically done by assigning an ephemeral carrier-grade NAT (CGNAT) IP address in the DNS response to the client. This CGNAT address is then used to connect to the resource. As the packets transit the network, the NAT system translates the address from the CGNAT address to the original workload address and vice-versa. This NAT operation is simply an obfuscation method. A packet targeting the CGNAT address is eventually routed to the workload. This presents an opportunity for malicious software to simply target the assigned CGNAT address and as a result, reach the workload itself because of the nature of the routability of the packet and the NAT operations. For example, an attacker that has a foothold on a device can learn the CGNAT range or direct IP range of a given workload by simply doing DNS reconnaissance on the compromised endpoint. From this, the attacker can craft packets targeting those routable addresses, whether NAT'd or not, and as a result, can target the workload for an exploit. This CGNAT obfuscation is a common practice used by ZTNA solutions that does not really provide a secure separation of networks as a routable packet reaching the CGNAT IP address(es) will be forwarded to the actual workload, and vice versa. In short, CGNAT is at best an obfuscation layer to hide internal IP addresses. However, CGNAT does not block unauthorized packets from reaching the workloads.

Moreover, an attacker with a foothold on a single device, over time, can learn all of the ranges of CGNAT address assignments that might occur for a given workload. For example, a server hosting 'finance.mycomany.com' might be assigned a range of CGNAT addresses that comprise 100 possible addresses. With this type of knowledge, an attacker can glean what the entire range is for the obfuscated addresses and then attempt to target those addresses from a different device at a future point in time. This type of passive reconnaissance can be done from a single compromised device without triggering any alerts in an extended detection response (XDR) system and/or the like that might be present. Once the possible range of CGNAT addresses is learned for a workload in a ZTNA solution, that intelligence can be used to progress an attack towards the workload serviced by that CGNAT system, perhaps via the same compromised device or another host within the ecosystem.

Additionally, in secure access ecosystems, there is a need to authenticate users with an external browser (e.g., a default browser of an operating system) because cookies in an embedded browser of an application cannot be shared with the external browser. As a result, the user is often prompted twice for multi-factor authentication (MFA), two-factor authentication (2FA), and/or the like. Once for the secure access solution (e.g., VPN or ZTNA) and a second time for the application itself. A common solution to this issue is to configure a loopback listener in the secure access client such that an external browser can complete the authentication workflow and then the SSO cookie can be used for applications that will traverse the secure access ecosystem. However, such a solution leads to a loopback listener (e.g., 127.0.0.1: <some_port>) is used and has to be actively listening on the endpoint device using a loopback address. This means that, at most, an implementation can use approximately 63,000 different ports to listen on. This has the adverse effect of making it exploitable by a brute force attack that can enumerate all of the available ports on a device and attempt to communicate with the secure access client software. This might be done using a phishing attack, for example, where a user clicks on an email link and that email link brings them to a server that either uses a websocket or a redirect to target the local machines loopback listener.

As such, there is a need to privatize addresses associated with cloud-based, private, and/or enterprise workloads to increase the security of such secure access systems.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1A:
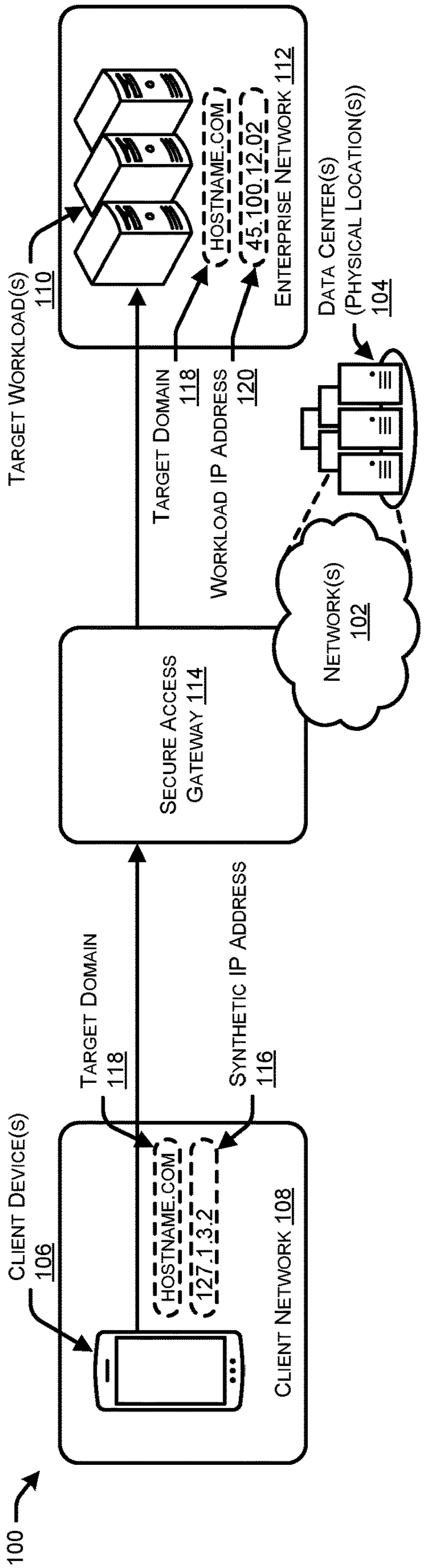
FIG. 1A illustrates a system-architecture diagram of an example environment for a client device to utilize a synthetic IP address to establish a connection with a target workload via a secure access gateway.

This disclosure describes method(s) for using non-routable addressing to reduce attack surface in secure access systems. The method includes receiving, from an application executing on a device in a first network domain, a first request to access a target workload provisioned in a second network domain. Additionally, or alternatively, the method includes determining that the target workload indicated by the first request is associated with a policy rule. Additionally, or alternatively, the method includes generating a synthetic internet protocol (IP) address associated with the target workload based at least in part on determining that the target workload is associated with the policy rule. Additionally, or alternatively, the method includes storing a first mapping between the synthetic IP address and the target workload. Additionally, or alternatively, the method includes receiving a second request to connect to the target workload from the application, the second request indicating the synthetic IP address. Additionally, or alternatively, the method includes establishing a first connection between the application and a secure access gateway associated with the target workload based at least in part on the first mapping between the synthetic IP address and the target workload.

Additionally, or alternatively, the method includes receiving, at an application on a device, an authentication request to establish a connection between the application and a target workload. Additionally, or alternatively, the method includes generating a random domain name associated with the device. Additionally, or alternatively, the method includes generating a synthetic internet protocol (IP) address associated with the device. Additionally, or alternatively, the method includes storing the synthetic IP address in association with the random domain name. Additionally, or alternatively, the method includes causing a loopback listener on the device to listen on the synthetic address on a random port. Additionally, or alternatively, the method includes invoking an external browser on the device in response to the authentication request, the external browser being redirected to the random domain name and the random port. Additionally, or alternatively, the method includes receiving, by the loopback listener, authentication data associated with the authentication request to establish the connection between the application and the target workload.

Additionally, the techniques described herein may be performed by a system and/or device having non-transitory computer-readable media storing computer-executable instructions that, when executed by one or more processors, performs the method described above.

Example Embodiments

This disclosure describes techniques for using non-routable addressing to reduce attack surface in secure access systems. In some examples, a client device (e.g., a mobile device, a laptop, a desktop computer, etc.) may be configured with a kernel driver framework (KDF) ecosystem. The KDF ecosystem may comprise a KDF interceptor and/or a Userspace interceptor, a KDF synthetic response handler, and/or a KDF synthetic DNS cache. The KDF ecosystem may be configured to intercept a DNS request from an application, determine whether the domain name included in the DNS request is associated with a domain rule, generate a synthetic IP address associated with the workload and cache the synthetic IP address to a corresponding fully qualified domain name (FQDN), return a synthetic DNS response including the synthetic IP address to the application, and/or establish a connection between the application and a secure access gateway (e.g., a VPN, a proxy, an HTTPs server, and/or any other system that allows access to resources in a secure manner) associated with accessing the workload by identifying the mapped FQDN based on the synthetic IP address. That is, the KDF ecosystem may be configured to establish a connection between an application and a target workload using a non-routable IP address (e.g., the synthetic IP address) by forwarding a packet addressed to the non-routable IP address to a secure access gateway. This ensures that the device and the workload are separated by a security system (e.g., the secure access gateway and/or the KDF ecosystem) that keeps the device network(s) and the workload network(s) isolated. Additionally, or alternatively, a client device equipped with the KDF ecosystem may be configured to handle authentication requests associated with establishing a connection between an application and a target workload. For example, the client device and/or KDF ecosystem may be configured to, in response to receiving an authentication request at an application executing on a device, generate a random domain name and a synthetic IP address associated with the device, store the random domain name and synthetic IP address in association with one another, cause a loopback listener on the device to listen on the synthetic IP address on a random port, invoke an external browser on the device (e.g., a standalone browser) in response to the authentication request and redirect the browser to the random domain name and random port, where the loopback listener may receive the authentication data associated with establishing the connection. In some examples, the KDF ecosystem may generate an authentication token based on the authentication data received via the external browser and store the authentication token for use by one or more applications. This authentication token may then be leveraged to respond to an additional authentication request received at an embedded browser of a given application, without the need to perform the authentication again.

As previously described, a target workload may be provisioned in a remote network (e.g., an enterprise network, a private network, etc.) and may be accessed by one or more client device(s). In previous systems, a client device may establish a connection with the target workload by authenticating with a secure access system (e.g., ZTNA, VPN, RDP, etc.). However, in such systems, an attacker that has compromised a client device can learn an IP address range (e.g., a CGNAT range and/or a direct IP range) of a given workload by simply doing DNS reconnaissance on the client device. That is, packets destined for the workload may be leveraged by an attacker to determine a routable IP address of the workload. From this, the attacker can craft packets targeting those routable addresses, whether NAT operations have been performed or not, and as a result, target the workload for an exploit. While secure access systems include various obfuscation methods (e.g., CGNAT obfuscation in ZTNA solutions), such methods do not provide a secure separation of networks as a routable packet reaching the routable IP addresses (e.g., CGNAT IP address(es)) will be forwarded to the actual workload. As such, a secure access gateway may be provisioned along a network path between a client device provisioned in a client network and a target workload provisioned in a remote network (e.g., an enterprise network). As described in more detail below, the secure access gateway may be configured to work in tandem with a KDF ecosystem executing on a client device establish a connection between the client device and a target workload.

In some examples, the secure access gateway may be configured as a VPN, a proxy, a hypertext transfer protocol secure (HTTPS) server, and/or any other system that allows access to resources and/or workloads in a secure manner. Additionally, or alternatively, the secure access gateway may employ various protocols, such as, for example, datagram transport layer security (DTLS), hypertext transfer protocol (HTTP)/2, HTTP/3, QUIC, and/or any other secure protocols. The secure access gateway may be configured to receive a connection redirect from a client device and establish a connection between the client device and the target workload while keeping the networks separate from one another and hiding the actual routable IP address of the target workload from attackers.

Take, for example, a network (e.g., cloud network(s), wide area network(s) (WANs), software defined network(s), and/or the like) comprising a secure access gateway service (or a node executing such a service). The secure access gateway may be configured to establish connections between client device(s) provisioned in client network(s) and target workload(s) provisioned in remote network(s). In some examples, the secure access gateway may be configured to enforce authentication of a user of the client device to access a given workload.

The client device may be configured with a KDF ecosystem comprising at least a KDF interceptor, a KDF synthetic response handler, and/or a KDF synthetic DNS cache. A user of the client device may execute an application on the client device, where the application may require connection to one or more target workload(s) of one or more remote network(s). Additionally, or alternatively, a Userspace interceptor may be leveraged to intercept function calls associated with DNS and/or IP connections in usermode. For example, an application may require connection to a workload of an enterprise network. The KDF interceptor may be configured to intercept DNS requests received from applications on the device. That is, an application may initiate a DNS request comprising a domain name of the target workload. The KDF interceptor may intercept the DNS request and determine whether the DNS request and/or the domain name is associated with a domain rule. For example, a policy comprising domain rule(s) may be enforced on the client device. The domain rule(s) may indicate individual domain names that are to be intercepted by the KDF ecosystem. In some examples, an enterprise associated with the workload may configure the policy on the client device such that DNS requests corresponding to the workload hosted in the enterprise network are to be intercepted by the KDF ecosystem. Additionally, or alternatively, the policy may be configured such that all DNS requests are to be intercepted by the KDF ecosystem.

As such, the KDF ecosystem may determine that the DNS request comprises a domain name associated with a domain rule. In response, the KDF synthetic response handler may be configured to generate a synthetic DNS response. For example, the KDF synthetic response handler may generate a synthetic IP address associated with the target workload. A synthetic IP address may be configured as a non-routable IP address. In some examples, a synthetic IP address may be configured as a synthetic IP version 4 (IPv4) address and/or an IP version 6 (IPv6) address. Examples of non-routable IP addresses that may be utilized as a synthetic IP address include, but are not limited to, a device-local IPv4 address in the range 0.x.x.x, an IPv4 loopback address within the 127.x.x.x range, a loopback address within a link-local address range (e.g., for synthetic IPv4/IPv6 addresses) and/or a loopback address within a discard prefix range (e.g., for synthetic IPv6 addresses). For example, the KDF synthetic response handler may be configured to identify a pool of unassigned IP addresses associated with the client device and randomly sample from the pool of unassigned IP addresses. Additionally, or alternatively, the KDF synthetic response handler may be configured to randomly generate a synthetic IP address according to a required format (e.g., IPv4, IPv6, etc.) and the KDF synthetic response handler may verify that the synthetic IP address is currently unassigned. The KDF synthetic response handler may then store the synthetic IP address in the KDF synthetic DNS cache. In some examples, the KDF ecosystem may be configured to cache the synthetic IP address to the DNS request FQDN mapping such that the synthetic address may be identified later on and the associated domain may be determined. The KDF synthetic response handler may then return the synthesized DNS response to the KDF interceptor, where the KDF interceptor may pass the synthesized DNS response, comprising the synthetic IP address, to the application from which the DNS request was received.

The KDF interceptor may then receive a request to connect to the resolved address (e.g., the synthetic IP address returned from the KDF interceptor in response to the DNS request) from the application. The KDF interceptor may query the KDF synthetic DNS cache to determine if the resolved address matches a synthetic address. Upon determining that the resolved address matches the synthetic address, the KDF interceptor may obtain a domain associated with the target workload (e.g., the mapped FQDN associated with the target workload). The KDF interceptor may be configured to determine whether the domain and/or the target workload is associated with a domain rule. Then, the KDF interceptor may cause the device and/or the application to redirect a connection to the domain. For example, the KDF interceptor may forward a redirected flow to a user space process associated with the application and/or device. In some examples, the user space process may redirect the connection to a secure access gateway associated with the network, where the secure access gateway may establish a connection between the client device and the target workload. For example, the user space process may comprise establishing a tunneled connection to the secure access gateway. In some examples, the tunneled connection may be configured as an HTTP/2 over TLS tunnel. Additionally, or alternatively, the tunneled connection may be configured as an HTTP/3 over QUIC tunnel. In some examples, the flow may be redirected from the application and to the secure access gateway via the tunneled connection. Additionally, or alternatively, the user space process may comprise sending a stream of bytes from the device and/or the application and to the secure access gateway. As previously described, the secure access gateway may be configured to authenticate the user of the client device prior to establishing the connection.

Additionally, or alternatively, the secure access gateway may maintain a mapping between a synthetic IP address associated with a client device and/or application and a domain associated with a target workload. In some examples, the secure access gateway may receive IP packets from the client device and/or the application that contain a header including a synthetic IP address. The secure access gateway may be configured to perform a NAT operation on the synthetic IP address to determine the routable IP address associated with the workload. Additionally, or alternatively, the secure access gateway may receive a byte stream from the client device and/or the application that indicates the domain of the target workload.

As previously described above, a client device configured with the KDF ecosystem may be further configured to handle authentication requests associated with establishing a connection between an application and a target workload according to the techniques described herein. Take, for example, the secure access gateway described above, configured to authenticate the user of the client device attempting to access the target workload. The client device may receive an authentication request associated with establishing a connection between an application and a target workload. In some examples, the authentication request may be received in association with an application executing on the client device. Additionally, or alternatively, an embedded browser of an application may be invoked requesting authentication from a user of the client device. In response to receiving the authentication request, the client device may begin execution of an authentication workflow, as described in more detail below.

In some examples, the client device may generate a random domain name for the client device. In some examples, the client device may be configured to ephemerally generate the random domain name using a cryptographically random string generation algorithm according to a required domain name format. That is, the client device may enforce a format corresponding to the domain name format when generating the random domain name. The domain name format may be any suitable domain format for the client device. For example, the randomly generated domain name may be "fd34asa649.ebo.local". It should be understood that the example domain name provided herein is for exemplary purposes and is not intended to be construed as a limitation. The client device may install a certificate authority with the random domain name in a certificate store of the operating system of the client device.

The KDF ecosystem may receive the random domain name and pass the random domain name to a KDF DNS interceptor of the KDF ecosystem. The KDF DNS interceptor may be configured to generate a synthetic IP address. As previously described, the synthetic IP address may be randomly generated and/or may be configured as a non-routable address (e.g., a loopback address within a link-local address range, a unique local address within a discard prefix range, and/or the like). Additionally, or alternatively, the synthetic IP address may be an IPv4 or an IPv6 address. For example, the randomly generated synthetic IP address may be "127.44.33.201". It should be understood that the example synthetic IP address provided herein is for exemplary purposes and is not intended to be construed as a limitation. This synthetic IP address is then cached in association with the randomly generated domain name. The KDF DNS interceptor may then return the synthetic loopback address to the application and/or the client device. The client device may be configured to listen on the assigned synthetic IP address on a random port. That is, the client device may generate a random port number (e.g., 45530), and cause a local listener on the client device to listen on the synthetic IP address on the random port (e.g., 127.44.33.201:45530).

In some examples, the client device may be configured to utilize the randomly generated domain name as a final redirect for authentication of the client device. Additionally, or alternatively, the randomly generated port may be utilized in association with the randomly generated domain name as the final redirect. For example, the final redirect may be "fd34asa694.ebo.local:45530". The client device may then invoke an external browser (e.g., a standalone and/or default browser of the client device) with the final redirect. The external browser may be invoked due to the limitations of embedded browsers of applications that do not allow cookies to be shared with an external browser. Once a user of the client device submits the required authentication information in the external browser, the client device may receive the authentication data via the local listener listening on the synthetic IP address (mapped to the random domain name) and random port. By receiving the authentication data using the non-routable synthetic IP address, the client device may generate authentication tokens, cookies, and/or the like that may be stored and/or leveraged by the application and/or additional applications. In this way, the client device may utilize the authentication token to satisfy the authentication request received at the embedded browser of the application.

As described herein, a computing-based, cloud-based solution, application, workload, client device, and/or network device, can generally include any type of resources implemented by virtualization techniques, such as containers, virtual machines, virtual storage, and so forth. Further, although the techniques described as being implemented in data centers and/or a cloud computing network, the techniques are generally applicable for any network of devices managed by any entity where virtual resources are provisioned. In some instances, the techniques may be performed by a schedulers or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to using non-routable addressing (e.g., synthetic IP address(es), loopback address(es), unique local address(es), and/or the like) to ensure an endpoint (e.g., a client device) and a workload (e.g., an enterprise resource) are separated by a security system configured to keep the endpoint and workload networks isolated from one another, increasing security in the network. For instance, the techniques described herein configure a client device comprising a kernel driver framework (KDF) to establish a connection with a target workload using a non-routable IP address. By enforcing domain rules on the client device, the KDF may intercept DNS requests, return synthetic DNS responses, and establish a connection with the endpoint via a secure access gateway utilizing a non-routable address. By obfuscating the actual IP address of a target workload, IP addresses an attacker gleans from DNS reconnaissance on a compromised client device are rendered useless, thus reducing the attack surface for secure access systems. Additionally, the techniques described herein remove the need to perform multi-factor authentication (MFA), two-factor authentication (2FA), and/or the like two or more times while reducing the attack surface of prior solutions, increasing security in the network. For instance, the techniques described herein configure a local listener of a client device to listen on the client device using a random loopback address on a random port. By creating a unique domain name with a cryptographically random string generation algorithm, generating a random loopback address, and generating a random port, an off-box attacker cannot guess what the loopback name or address is on the device. This makes a brute force attack impractical to achieve given the large number of possible permutations (e.g., about 16,777,216 permutations in IPv4 and about 18,446,744,073,709,551,616 permutations in IPv6).

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1B:
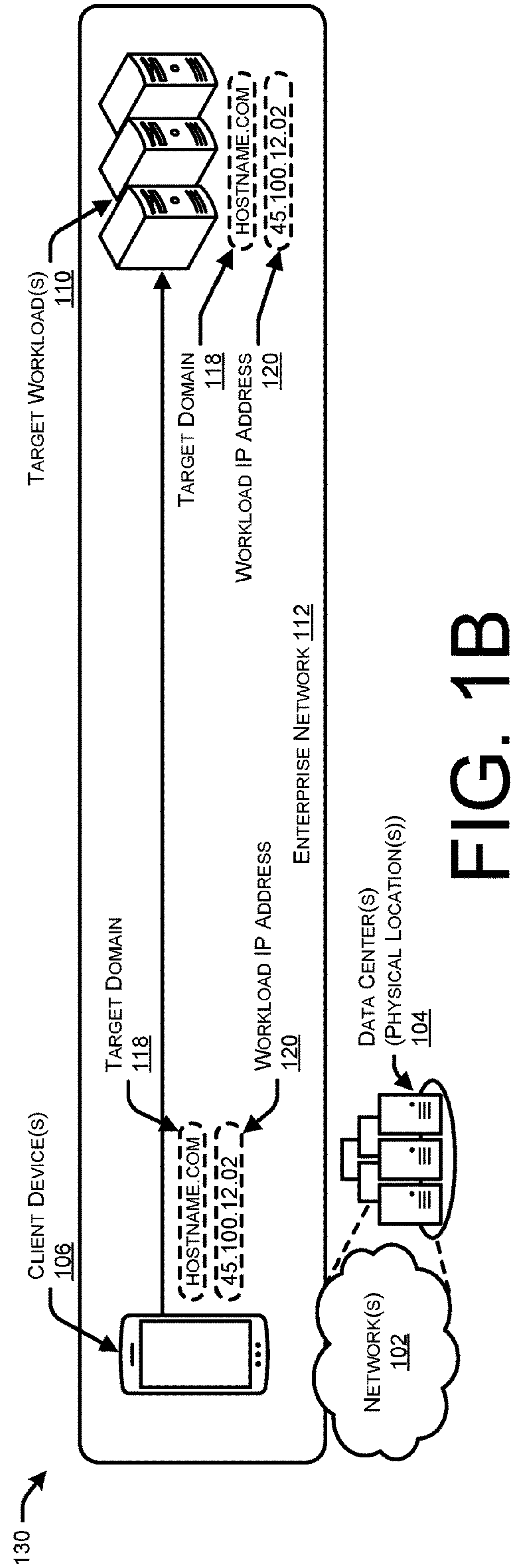
FIG. 1B illustrates a system-architecture diagram of an example environment for a client device to establish a connection with a target workload utilizing the workload IP address.

FIGS. 1A and 1B illustrate system architecture diagrams of example environments 100, 130 for a client device to establish a connection with a target workload. In some examples, an example environment 100 may comprise one or more network(s) 102 for implementing the various secure access connection technologies described herein. Generally, the network 102 may include devices that are housed or located in one or more data centers 104 that may be located at different physical locations. For instance, the network 102 may be supported by networks of devices in a public cloud computing platform, a private/enterprise computing platform, and/or any combination thereof. The one or more data centers 104 may be physical facilities or buildings located across geographic areas that are designated to store networked devices that are part of the network 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the network 102 may not be located in explicitly defined data centers 104 and, rather, may be located in other locations or buildings.

The network(s) 102 may include one or more networks implemented by any viable communication technology, such as wired and/or wireless modalities and/or technologies. The network 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.), Virtual Private Networks (VPNs), Wide Area Networks (WANs)—both centralized and/or distributed—and/or any combination, permutation, and/or aggregation thereof. The network 102 may include devices, virtual resources, or other nodes that relay packets from one network segment to another.

FIG. 1A illustrates a system-architecture diagram of an example environment 100 for a client device 106 provisioned in a client network 108 to establish a connection with a target workload 110 in an enterprise network 112 (or private/remote network) via a secure access gateway 114 (e.g., a VPN, a proxy, an HTTPs server, and/or any other system that allows access to resources in a secure manner) utilizing a synthetic IP address 116. In some examples, the secure access gateway 114 may employ various protocols to establish and/or stitch together one or more connection(s), such as, for example, datagram transport layer security (DTLS), hypertext transfer protocol (HTTP)/2, HTTP/3, QUIC, and/or any other secure protocols.

Figure 2:
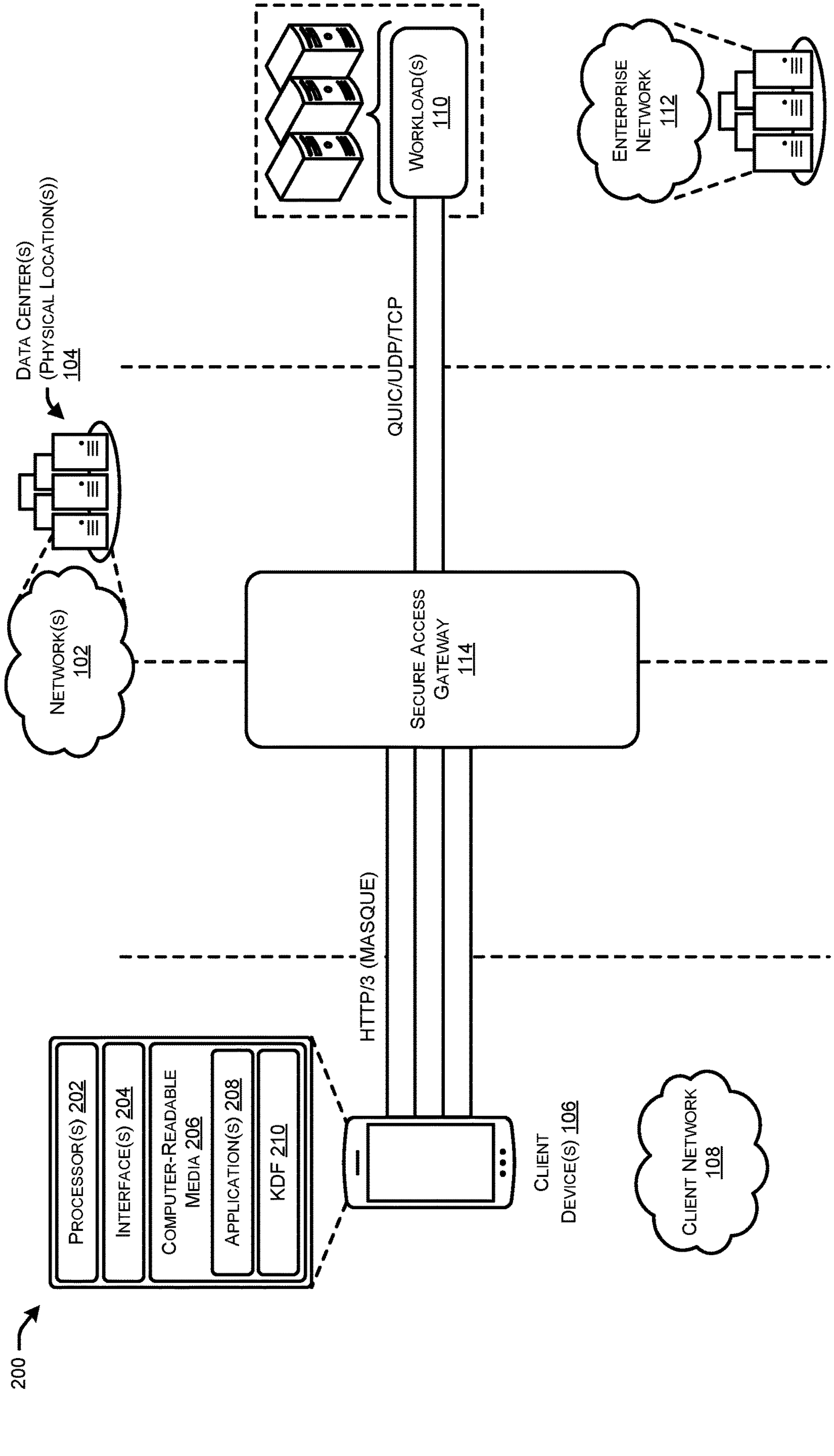
FIG. 2 illustrates a system-architecture diagram of an example environment for implementing at least some of the various technologies described herein.
Figure 3:
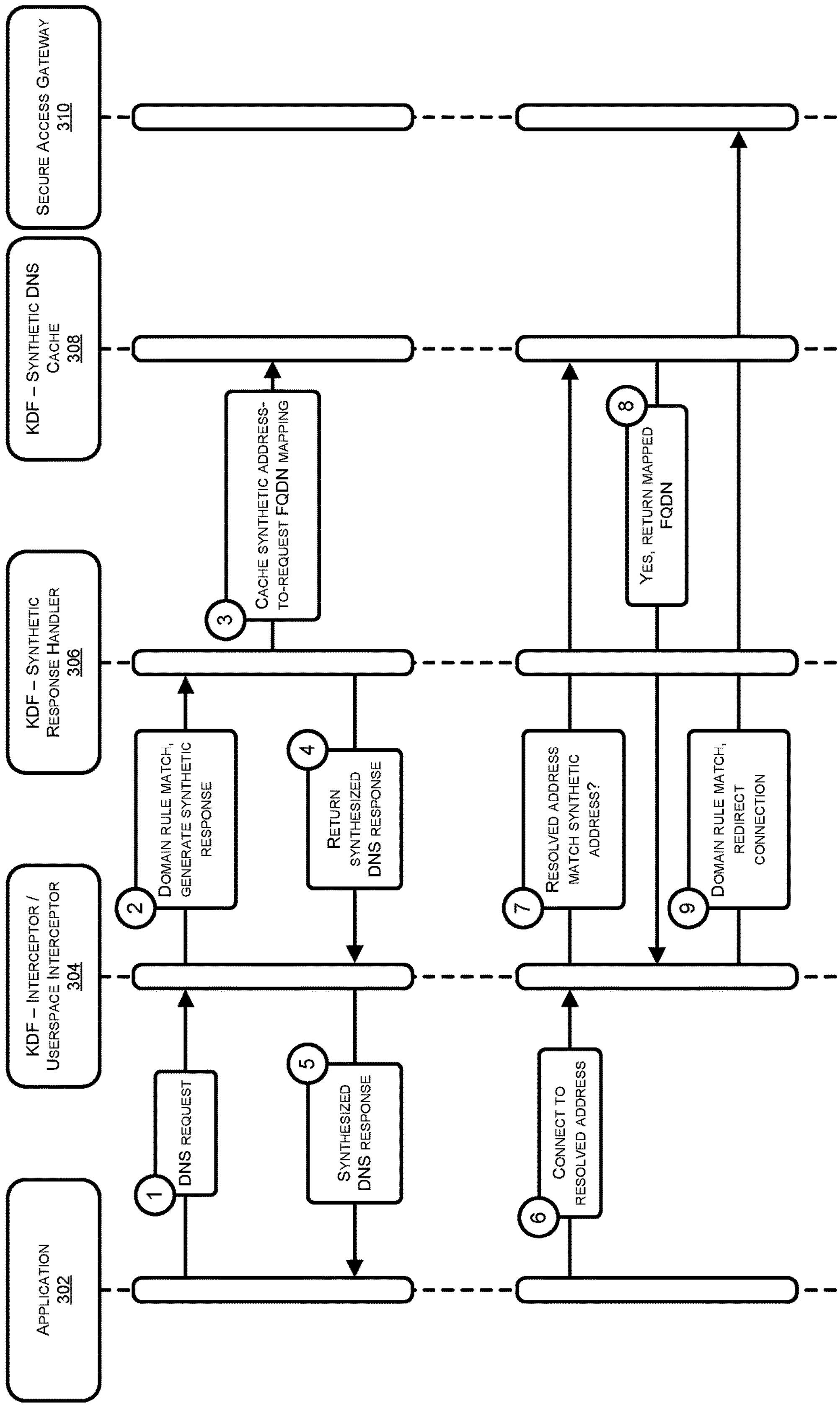
FIG. 3 illustrates a data flow diagram of an example process according to which a kernel driver framework (KDF) ecosystem may implement at least some of the various technologies described herein.
Figure 4:
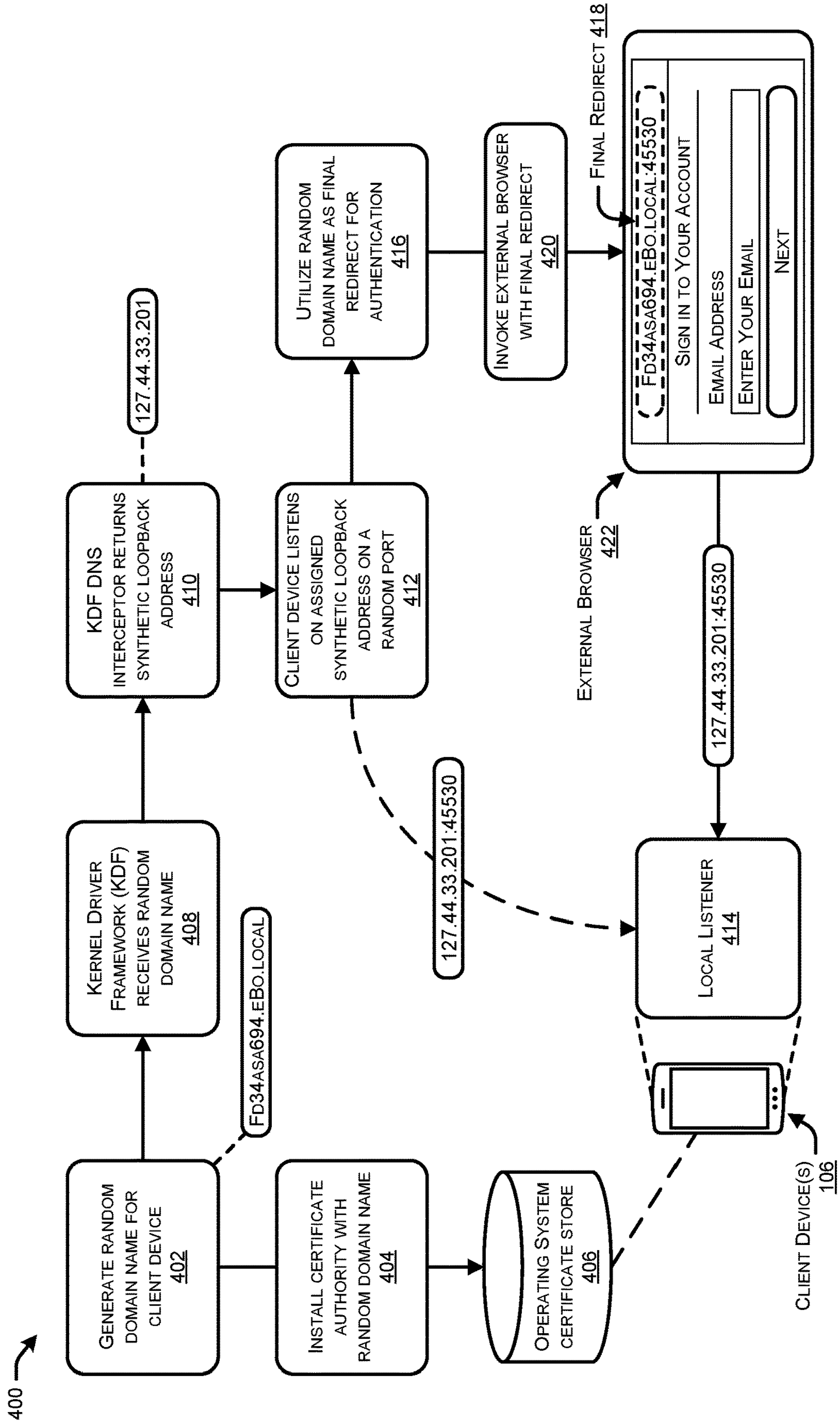
FIG. 4 illustrates a data flow diagram of an example process according to which a kernel driver framework (KDF) ecosystem may implement at least some of the various technologies described herein.

In some examples, a client device 106 (e.g., a mobile device, a laptop, a desktop computer, etc.) may be configured with a kernel driver framework (KDF) ecosystem, as described in more detail with respect to FIGS. 2-4. The KDF ecosystem may comprise a KDF interceptor, a KDF synthetic response handler, and/or a KDF synthetic DNS cache. A client device 106 equipped with the KDF ecosystem as described herein may be configured to intercept a DNS request from an application indicating a target domain 118, determine whether the target domain 118 (e.g., a domain name) included in the DNS request is associated with a domain rule, generate a synthetic IP address 116 associated with the workload 110 and cache the synthetic IP address 116 to a corresponding fully qualified domain name (FQDN), return a synthetic DNS response including the synthetic IP address 116 to the application, and/or establish a connection between the application and/or client device 106 and a secure access gateway 114 associated with accessing the workload 110 by identifying the mapped FQDN based on the synthetic IP address 116. That is, the KDF ecosystem may be configured to establish a connection between an application executing on a client device 106 and a target workload 110 using anon-routable IP address (e.g., the synthetic IP address 116) by forwarding a packet (or a stream of bytes) addressed to the non-routable IP address to a secure access gateway 114. This ensures that the client device 106 and the target workload 110 are separated by a security system (e.g., the secure access gateway 114 and/or the KDF ecosystem) that keeps the device network(s) 108 and the workload network(s) 112 isolated. In some examples, the secure access gateway 114 may maintain a mapping between synthetic IP addresses associated with a client device 106 and a domain associated with the target workload 110, such that when IP packets are received having the synthetic IP address 116 in a header field, the secure access gateway 114 may determine the domain of the target workload 110. Additionally, or alternatively, a stream of bytes may indicate the domain associated with the target workload 110.

As described in more detail with respect to FIG. 3, the KDF ecosystem and/or the client device 106 may be configured to forward packets addressed to synthetic IP address (es) 116 to the secure access gateway 114, where the secure access gateway 114 may establish a first connection between the client device 106 and the secure access gateway 114 utilizing the synthetic IP address 116 and/or the target domain 118 and/or a second connection between the secure access gateway 114 and the target workload(s) 110 utilizing the target domain 118 and/or the workload IP address 120 (e.g., the routable IP address 120 associated with the target workload 110). In some examples, the secure access gateway 114 may be configured to enforce an authentication workflow in association with the client device 106 prior to establishing a connection between the client device 106 and the target workload(s) 110, as described in more detail with respect to FIG. 4. Additionally, or alternatively, the secure access gateway 114 may be configured to stitch the first connection and the second connection together such that data may flow between the client device 106 (or the application executing therein) and the target workload 110. In this way, the workload IP address 120 of the target workload may be hidden from the first connection between the client device 106 and the secure access gateway 114, as the synthetic IP address 116 is utilized in establishing the first connection, and the secure access gateway 114 may utilize the mapped FQDN information (e.g., the target domain 118) to determine (e.g., via NAT) the workload IP address 120 and establish the second connection.

By obfuscating the workload IP address 120 of a target workload 110 with respect to the client device 106, IP addresses an attacker gleans from DNS reconnaissance on a compromised client device 106 are rendered useless, thus reducing the attack surface for secure access systems. Such improvements may be realized when compared to prior systems utilized to establish a connection with a target workload 110 utilizing the workload IP address 120 of the target workload 110, such as, for example, the example environment 130 as described with respect to FIG. 1B.

Additionally, or alternatively, a client device 106 equipped with the KDF ecosystem may be configured to handle authentication requests associated with establishing the connection between the application and the target workload 110, as described in more detail below with respect to FIG. 4. For example, the client device 106 and/or KDF ecosystem may be configured to, in response to receiving an authentication request at an application executing on the client device 106, generate a random domain name and a synthetic IP address 116 associated with the client device 106, store the random domain name and synthetic IP address 116 in association with one another, cause a loopback listener on the client device 106 to listen on the synthetic IP address 116 on a random port, invoke an external browser on the client device 106 (e.g., a standalone browser) in response to the authentication request and redirect the browser to the random domain name and random port, where the loopback listener may receive the authentication data associated with establishing the connection. In some examples, the KDF ecosystem may generate an authentication token based on the authentication data received via the external browser and the client device 106 may store the authentication token locally for use by one or more applications. This authentication token may then be leveraged to respond to an additional authentication request received at an embedded browser of a given application, without the need to perform the authentication again. By creating a unique domain name with a cryptographically random string generation algorithm, generating a random loopback address, and generating a random port, an off-box attacker cannot guess what the loopback name or address is on the client device. This makes a brute force attack impractical to achieve given the large number of possible permutations (e.g., about 16,777,216 permutations in IPv4 and about 18,446,744,073,709,551, 616 permutations in IPv6).

FIG. 1B illustrates a system-architecture diagram of an example environment 130 for a client device 106 to establish a connection with a target workload 110 utilizing the workload IP address 120. As previously described, example environment 130 may correspond to prior systems utilized to establish secure access connections between client device(s) 106 and target workload(s) 110. As illustrated in FIG. 1B, the client device 106 may establish a connection with a target workload 110 provisioned in an enterprise network 112 via a secure access system (e.g., VPN, ZTNA, SSH, RDP, and/or the like) utilizing DNS assigned addresses to connect to the target workload 110. That is, a client device 106 may request to connect to a target workload 110 with a DNS request indicating a target domain 118 and may receive a DNS response indicating a workload IP address 120 as a resolved address. With the resolved workload IP address 120, the client device 106 may send a request to connect to the target workload 110 utilizing the workload IP address 120 via the secure access system. By establishing a connection in this way according to prior systems, the workload IP address 120 may be learned by an attacker having a foothold on the client device 106, leaving the target workload 110 and/or additional resources of the enterprise network 112 at risk.

However, by utilizing the example environment 100 and the techniques as described herein with respect to FIG. 1A, the client device(s) 106 are executing on their own isolated unique client network 108 that is separated from the enterprise network 112. Thus, an attacker that has compromised a client device 106 cannot glean anything about the enterprise network 112 and/or the target workload 110 (e.g., workload IP address(es) 120). Instead, the attacker will only obtain the synthetic IP address 116 which is simply a non-routable address (e.g., a loopback address within a link-local address range, a unique local address within a discard prefix range, and/or the like) and cannot be utilized to attack and/or gain additional information associated with the enterprise network 112 and/or the target workload 110.

FIG. 2 illustrates a system-architecture diagram of an example environment 200 for implementing at least some of the various technologies described herein. In some examples, the environment 200 may correspond to the example environment 100, as described with respect to FIG. 1A. Additionally, or alternatively, the secure access gateway 114 may be configured to utilize the Multiplexed Application Substrate over QUIC Encryption (MASQUE) protocol, providing a mechanism for proxying different types of protocols (e.g., HTTP proxying, DNS over HTTPS, QUIC proxying, UDP proxying, and IP proxying) using a single secure access solution to connect the client device 106 to the target workload 110. A client device 106 may comprise one or more processor(s) 202, one or more interface(s) 204, and/or computer-readable media 206 storing one or more application(s) 208 and/or a KDF 210. In some examples, the application(s) 208 and or the KDF 210 may correspond to the application and/or the KDF ecosystem as described above with respect to FIG. 1A.

Take, for example, a network 102 (e.g., cloud network(s), wide area network(s) (WANs), software defined network(s), and/or the like) comprising a secure access gateway service 114 (or a node executing such a service). The secure access gateway 114 may be configured to establish connections between client device(s) 106 provisioned in client network(s) 108 and target workload(s) 110 provisioned in remote network(s) 112. In some examples, the secure access gateway 114 may be configured to enforce authentication of a user of the client device 106 to access a given workload 110.

As previously described, the KDF 210 and/or the client device 106 may be configured to forward packets and/or a stream of bytes addressed to synthetic IP address(es) to the secure access gateway 114, where the secure access gateway 114 may establish a first connection between the client device 106 and the secure access gateway 114 utilizing the synthetic IP address and/or the target domain and/or a second connection between the secure access gateway 114 and the target workload(s) 110 utilizing the target domain and/or the workload IP address (e.g., the routable IP address associated with the target workload 110). In some examples, the first connection may comprise an HTTP/2, HTTP/3, and/or a MASQUE protocol. Additionally, or alternatively, the second connection may comprise a QUIC protocol, user datagram protocol (UDP), transmission control protocol (TCP), and/or the like. The secure access gateway 114 may be configured to stitch the first connection and the second connection together such that data may flow between the client device 106 (or the application executing therein) and the target workload 110. In this way, the workload IP address of the target workload may be hidden in the first connection between the client device 106 and the secure access gateway 114, as the synthetic IP address is utilized in establishing the first connection, and the secure access gateway 114 may utilize the mapped FQDN information (e.g., the target domain) to determine the workload IP address and establish the second connection. This process is described in more detail below with respect to FIG. 3.

FIG. 3 illustrates a data flow diagram 300 of an example process according to which a kernel driver framework (KDF) ecosystem may implement at least some of the various technologies described herein. In some examples, the KDF ecosystem may correspond to the KDF 210 of the client device 106 as described with respect to FIG. 2. The KDF ecosystem may be utilized on a client device, that is provisioned in a client network and executing one or more application(s) 302, to establish a connection between the one or more application(s) 302 and a target workload provisioned in a remote network utilizing a secure access gateway 310. Additionally, or alternatively, the KDF ecosystem may comprise at least a KDF interceptor/Userspace interceptor 304, a KDF synthetic response handler 306, and/or a KDF synthetic DNS cache 308. The data flow diagram 300 may represent an example process that may be implemented utilizing the example environments 100, 200 and/or the components thereof as described with respect to FIGS. 1A and 2, respectively.

The client device may execute an application 302, where the application 302 may require connection to one or more target workload(s) of one or more remote network(s). For example, an application 302 may require connection to a workload of an enterprise network.

At “1,” the KDF interceptor/Userspace interceptor 304 may be configured to intercept DNS requests received from applications 302 on the device. That is, an application 302 may initiate a DNS request comprising a domain name of the target workload, and the KDF interceptor/Userspace interceptor 304 may intercept the DNS request.

At “2,” the KDF interceptor/Userspace interceptor 304 may intercept the DNS request and determine whether the DNS request and/or the domain name is associated with a domain rule. For example, a policy comprising domain rule(s) may be enforced on the client device. The domain rule(s) may indicate individual domain names that are to be intercepted by the KDF interceptor/Userspace interceptor 304. In some examples, an enterprise associated with the workload may configure the policy on the client device such that DNS requests corresponding to the workload hosted in the enterprise network are to be intercepted by the KDF ecosystem. Additionally, or alternatively, the policy may be configured such that all DNS requests are to be intercepted by the KDF ecosystem.

At “3,” the KDF interceptor/Userspace interceptor 304 may determine that the DNS request comprises a domain name associated with a domain rule. In response, the KDF synthetic response handler 306 may be configured to generate a synthetic DNS response. For example, the KDF synthetic response handler 306 may generate a synthetic IP address associated with the target workload. A synthetic IP address may be configured as a non-routable IP address. In some examples, a synthetic IP address may be configured as a synthetic IP version 4 (IPv4) address and/or an IP version 6 (IPv6) address. Examples of non-routable IP addresses that may be utilized as a synthetic IP address include, but are not limited to, a device-local IPv4 address in the range 0.x.x.x, an IPv4 loopback address within the 127.x.x.x range, a loopback address within a link-local address range (e.g., for synthetic IPv4/IPv6 addresses) and/or a loopback address within a discard prefix range (e.g., for synthetic IPv6 addresses). For example, the KDF synthetic response handler 306 may be configured to identify a pool of unassigned IP addresses associated with the client device and randomly sample from the pool of unassigned IP addresses. Additionally, or alternatively, the KDF synthetic response handler 306 may be configured to randomly generate a synthetic IP address according to a required format (e.g., IPv4, IPv6, etc.) and the KDF synthetic response handler may verify that the synthetic IP address is currently unassigned. The KDF synthetic response handler 306 may then store the synthetic IP address in the KDF synthetic DNS cache 308. In some examples, the KDF synthetic response handler 306 may be configured to cache the synthetic IP address to the DNS request FQDN mapping such that the synthetic address may be identified later on and the associated domain may be determined.

At "4," the KDF synthetic response handler 306 may then return the synthesized DNS response to the KDF interceptor/ Userspace interceptor 304.

At "5," the KDF interceptor/Userspace interceptor 304 may pass the synthesized DNS response, comprising the synthetic IP address, to the application 302 from which the DNS request was received.

At "6," the KDF interceptor/Userspace interceptor 304 may then receive a request to connect to the resolved address (e.g., the synthetic IP address returned from the KDF interceptor/Userspace interceptor 304 in response to the DNS request at "1") from the application 302.

At "7," the KDF interceptor/Userspace interceptor 304 may query the KDF synthetic DNS cache 308 to determine if the resolved address matches a synthetic address.

At "8," upon determining that the resolved address matches the synthetic address, the KDF interceptor/Userspace interceptor 304 may obtain the domain associated with the target workload (e.g., the mapped FQDN associated with the target workload).

At "9," the KDF interceptor/Userspace interceptor 304 may be configured to determine whether the domain is associated with a domain rule (similar to step "2"). Then, the KDF interceptor/Userspace interceptor 304 may cause the device and/or the application to redirect a connection to the domain. For example, the KDF interceptor/Userspace interceptor 304 may forward a redirected flow to a user space process associated with the application and/or device. In some examples, the user space process may redirect the connection to a secure access gateway 310 associated with the network, where the secure access gateway 310 may establish a connection between the client device (or the application 302) and the target workload. For example, the user space process may comprise establishing a tunneled connection to the secure access gateway. In some examples, the tunneled connection may be configured as an HTTP/2 over TLS tunnel. Additionally, or alternatively, the tunneled connection may be configured as an HTTP/3 over QUIC tunnel. In some examples, the flow may be redirected from the application and to the secure access gateway via the tunneled connection. Additionally, or alternatively, the user space process may comprise sending a stream of bytes from the device and/or the application and to the secure access gateway. As described in more detail below with respect to FIG. 4, the secure access gateway 310 and/or the KDF ecosystem (or components thereof) may be configured to authenticate the user of the client device prior to establishing the connection.

Referring back to FIG. 2, the secure access gateway 114 may be configured to enforce an authentication workflow in association with the client device 106 prior to establishing a connection between the client device 106 and the target workload(s) 110. That is, a client device 106 equipped with the KDF 210 may be configured to handle authentication requests associated with establishing the connection between the application 208 and the target workload 110. For example, the client device 106 and/or KDF 210 may be configured to, in response to receiving an authentication request at an application 208 executing on the client device 106, generate a random domain name and a synthetic IP address associated with the client device 106, store a mapping between the random domain name and synthetic IP address, cause a loopback listener on the client device 106 to listen on the synthetic IP address on a random port, invoke an external browser on the client device 106 (e.g., a standalone browser) in response to the authentication request and redirect the browser to the random domain name and random port, where the loopback listener may receive the authentication data associated with establishing the connection. In some examples, the KDF 210 and/or the client device 106 may generate an authentication token based on the authentication data received via the external browser and the client device 106 may store the authentication token locally for use by one or more applications 208. This authentication token may then be leveraged to respond to an additional authentication request received at an embedded browser of a given application 208, without the need to perform the authentication again. This process is described in more detail below with respect to FIG. 4.

FIG. 4 illustrates a data flow diagram 400 of an example process according to which a kernel driver framework (KDF) ecosystem may implement at least some of the various technologies described herein. In some examples, the KDF ecosystem may correspond to the KDF 210 of the client device 106 as described with respect to FIG. 2. The KDF ecosystem may be utilized to configure a loopback listener of a client device, provisioned in a client network, to listen on a synthetic address and random port to receive authentication data for establishing a connection between an application executing on the device and a target workload provisioned in a remote network. In some examples, the KDF ecosystem may comprise at least a KDF interceptor/ Userspace interceptor 304, a KDF synthetic response handler 306, and/or a KDF synthetic DNS cache 308, as described with respect to FIG. 3. The data flow diagram 400 may represent an example process that may be implemented utilizing the example environments 100, 200 and/or the components thereof as described with respect to FIGS. 1A and 2, respectively.

Take, for example, the secure access gateway 114, 310 described with respect to FIGS. 1A, 2, and 3, configured to authenticate the user of the client device 106 attempting to access the target workload. The client device 106 may receive an authentication request associated with establishing a connection between an application and a target workload. In some examples, the authentication request may be received in association with an application executing on the client device 106. Additionally, or alternatively, an embedded browser of an application may be invoked requesting authentication from a user of the client device 106. In response to receiving the authentication request, the client device may begin execution of an authentication workflow, as described in more detail below.

At 402, the client device 106 may generate a random domain name for the client device 106. In some examples, the client device 106 may be configured to ephemerally generate the random domain name using a cryptographically random string generation algorithm according to a required domain name format. That is, the client device 106 may enforce a format corresponding to a given domain name format when generating the random domain name. The domain name format may be any suitable domain format for the client device 106. As illustrated in FIG. 4, the randomly generated domain name may be "fd34asa649.ebo.local". The example domain name provided herein is for exemplary purposes and is not intended to be construed as a limitation.

At 404, client device may install a certificate authority with the random domain name in a certificate store 406 of the operating system of the client device 106.

At 408, the KDF ecosystem may receive the random domain name and pass the random domain name to a KDF DNS interceptor (also referred to herein as a KDF synthetic response handler) of the KDF ecosystem.

At 410, the KDF DNS interceptor may be configured to generate a synthetic IP address. As previously described, the synthetic IP address may be randomly generated and/or may be configured as a non-routable address (e.g., a loopback address within a link-local address range, a unique local address within a discard prefix range, and/or the like). Additionally, or alternatively, the synthetic IP address may be an IPv4 or an IPv6 address. As illustrated in FIG. 4, the randomly generated synthetic IP address may be "127.44.33.201". The example synthetic IP address provided herein is for exemplary purposes and is not intended to be construed as a limitation. This synthetic IP address is then cached in association with the randomly generated domain name. The KDF DNS interceptor may then return the synthetic loopback address to the application and/or the client device 106.

At 412, the client device 106 may be configured to listen on the assigned synthetic IP address on a random source port. That is, the client device 106 may generate a random source port number (e.g., 45530), and cause a local listener 414 on the client device 106 to listen on the synthetic IP address on the random port (e.g., 127.44.33.201:45530). In some examples, the source port may be randomly generated and/or chosen by the application executing on the client device 106.

At 416, the client device 106 may be configured to utilize the randomly generated domain name as a final redirect 418 for authentication of the client device 106. Additionally, or alternatively, the randomly generated port may be utilized in association with the randomly generated domain name as the final redirect 418. For example, the final redirect 418 may be "fd34asa694. ebo.local:45530".

At 420, the client device 106 and/or the KDF ecosystem may then invoke an external browser 422 (e.g., a standalone and/or default browser of the client device 106) with the final redirect 418. The external browser 422 may be invoked due to the limitations of embedded browsers of applications that do not allow cookies to be shared with an external browser. Once a user of the client device 106 submits the required authentication information in the external browser 422, the client device 106 may receive the authentication data via the local listener 414 listening on the synthetic IP address (mapped to the random domain name) and/or random port. By receiving the authentication data using the non-routable synthetic IP address, the client device 106 may generate authentication tokens, cookies, and/or the like that may be stored and/or leveraged by the application and/or additional applications. In this way, the client device 106 may utilize the authentication token to satisfy the authentication request received at the embedded browser of the application.

By creating a unique domain name with a cryptographically random string generation algorithm, generating a random loopback address, and generating a random port, an off-box attacker cannot guess what the loopback name or address is on the client device. For example, in prior systems, an attacker would only have to enumerate roughly 64,000 different port numbers in combination with a standard loopback address (e.g., 127.0.0.1). However, utilizing the techniques described herein, an attacker would have to enumerate roughly 16,777,216 permutations in examples where IPv4 addresses are utilized and roughly 18,446,744, 073,709,551,616 permutations in examples where IPv6 addresses are utilized. This makes a brute force attack impractical to achieve given the large number of possible permutations.

Figure 5:
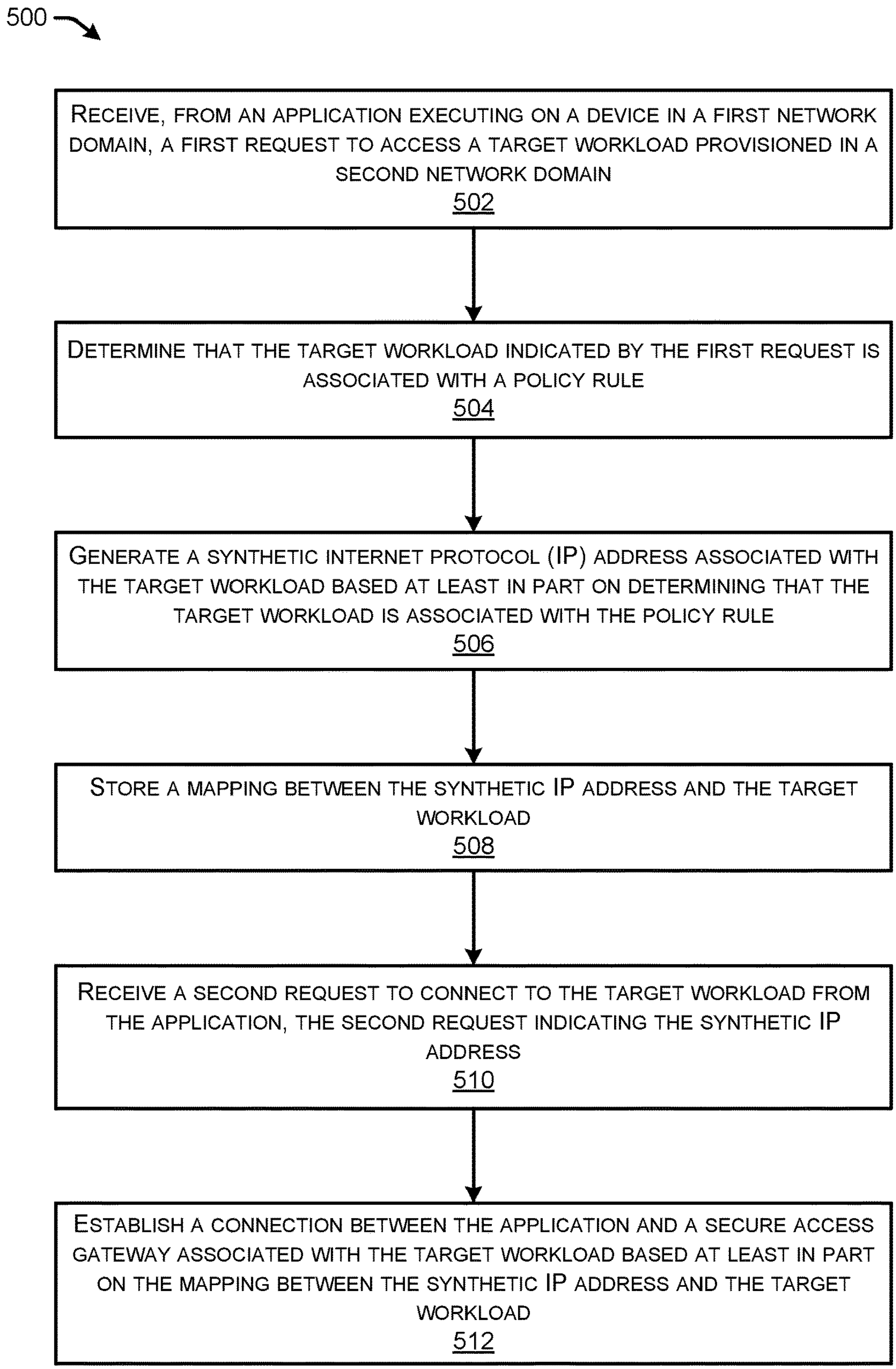
FIG. 5 illustrates a flow diagram of an example method for a device to generate a synthetic IP address and utilize the synthetic IP address to establish a connection between an application executing on the device and a secure access gateway associated with accessing a target workload provisioned in an enterprise and/or private network.
Figure 6:
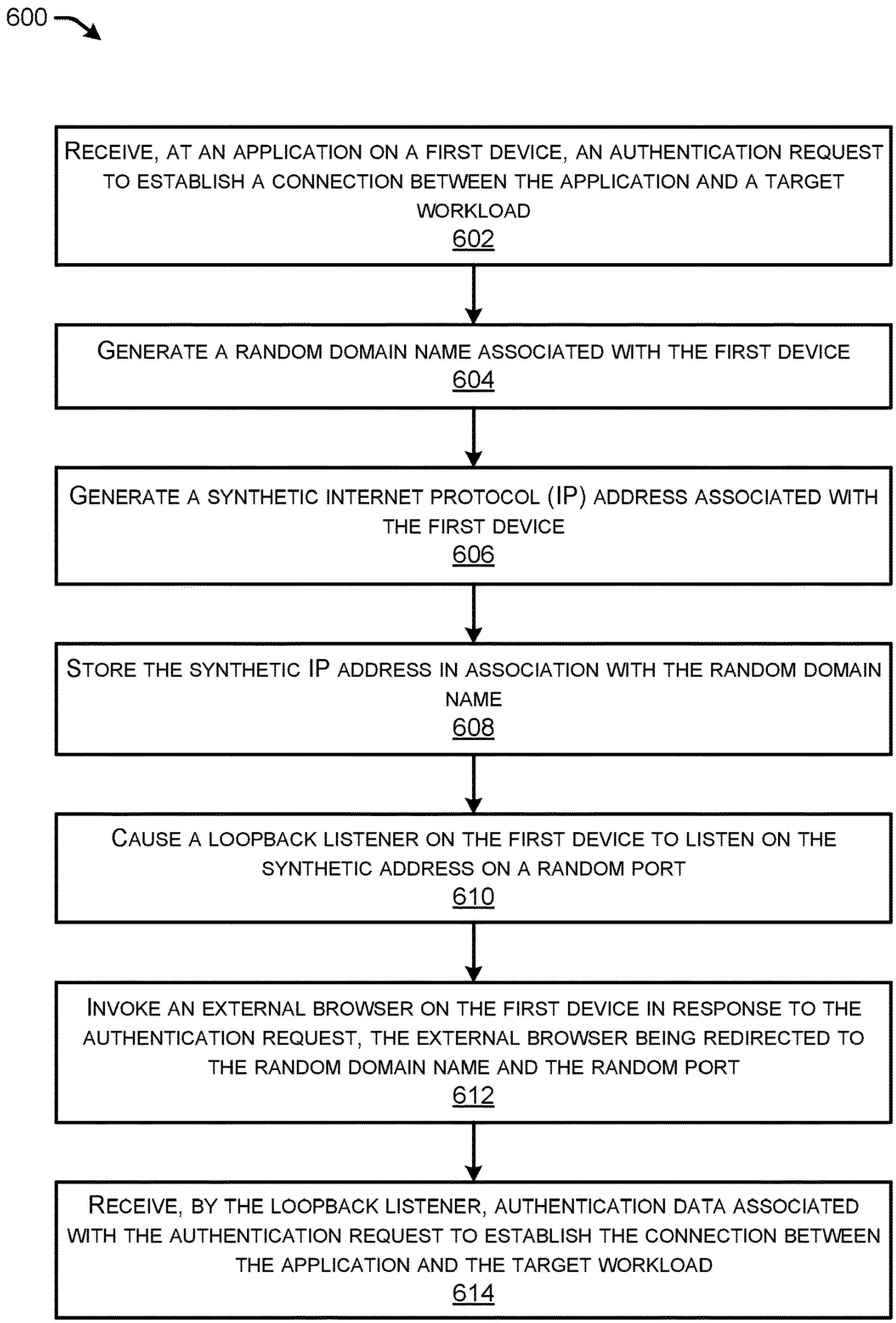
FIG. 6 illustrates a flow diagram of an example method for a device to configure a loopback listener to listen on a synthetic address and random port to receive authentication data for establishing a connection between an application executing on the device and a target workload provisioned in an enterprise and/or private network.

FIGS. 5 and 6 illustrate flow diagrams of example method(s) (or process(es)) 500 and/or 600 and that illustrate aspects of the functions performed at least partly by the network(s), the enterprise network(s), the client network(s), and/or the KDF ecosystem, the secure access gateway, the respective components as described with respect to FIGS. 1A and 2-4. The logical operations described herein with respect to FIGS. 5 and 6 may be implemented (1) as a sequence of computer-implemented acts or program modules running on a computing system and/or (2) as interconnected machine logic circuits or circuit modules within the computing system. In some examples, the method(s) 500 and/or 600 may be performed by a system comprising one or more processors and one or more non-transitory computer-readable media storing computer-executable instructions that, when executed by the one or more processors, cause the one or more processors to perform the method(s) 500 and/or 600.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5 and 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 5 illustrates a flow diagram of an example method 500 for a device provisioned in a client network to generate a synthetic IP address and utilize the synthetic IP address to establish a connection between an application executing on the device and a secure access gateway associated with accessing a target workload provisioned in a remote network (e.g., an enterprise and/or private network). In some examples, the device, the client network, the target workload, the remote network, the secure access gateway, and/or the synthetic IP address may correspond to the client device 106, the client network 108, the target workload 110, the enterprise network 112, the secure access gateway 114, and/or the synthetic IP address 116, as described with respect to FIGS. 1A and 2.

At 502, the method 500 may include receiving, from an application executing on a device in a first network domain, a first request to access a target workload provisioned in a second network domain.

At 504, the method 500 may include determining that the target workload indicated by the first request is associated with a policy rule.

At 506, the method 500 may include generating a synthetic internet protocol (IP) address associated with the target workload based at least in part on determining that the target workload is associated with the policy rule.

At 508, the method 500 may include storing a first mapping between the synthetic IP address and the target workload.

At 510, the method 500 may include receiving a second request to connect to the target workload from the application, the second request indicating the synthetic IP address.

At 512, the method 500 may include establishing a first connection between the application and a secure access gateway associated with the target workload based at least in part on the first mapping between the synthetic IP address and the target workload.

In some examples, the synthetic IP address may be randomly generated.

In some examples, the synthetic IP address may be one of a loopback address within a link-local address range or a unique local address within a discard prefix range.

In some examples, the first request may be a domain name system (DNS) request and/or the second request may indicate a request to connect to a resolved address. Additionally, or alternatively, the method 500 may include sending, to the application and in response to the DNS request, a synthesized DNS response, the synthesized DNS response indicating the synthetic IP address as the resolved address.

In some examples, the synthetic IP address may be a first synthetic IP address. Additionally, or alternatively, the method 500 may include receiving, from the secure access gateway, a third request to authenticate the first request to access the target workload. Additionally, or alternatively, the method 500 may include generating a random domain name associated with the device. Additionally, or alternatively, the method 500 may include generating a second synthetic IP address associated with the device. Additionally, or alternatively, the method 500 may include storing a second mapping between the second synthetic IP address and the random domain name. Additionally, or alternatively, the method 500 may include causing a loopback listener on the device to listen on the second synthetic IP address on a random port. Additionally, or alternatively, the method 500 may include invoking an external browser on the device in response to the third request, the external browser being redirected to the random domain name and the random port. Additionally, or alternatively, the method 500 may include receiving, by the loopback listener, authentication data associated with the third request to authenticate the first request to access the target workload.

In some examples, the second network domain may be associated with an enterprise. Additionally, or alternatively, the method 500 may include receiving a network policy associated with the enterprise. Additionally, or alternatively, the method 500 may include identifying the policy rule of the network policy, the policy rule being associated with accessing the target workload provisioned in the second network domain. Additionally, or alternatively, determining that the target workload is associated with the policy rule may be based at least in part on identifying the policy rule of the network policy.

In some examples, the first mapping may comprise a fully qualified domain name (FQDN) mapping indicating a domain name of the target workload.

In some examples, the synthetic IP address may be one of an IP version 4 (IPv4) or an IP version 6 (Ipv6) address.

In some examples, establishing the first connection between the application and the secure access gateway may be based at least in part on a random port associated with the device. That is, according to the techniques described herein, the port number may be obfuscated in a similar manner as the IP address.

In some examples, the first connection between the application and the secure access gateway may comprise one of a hypertext transfer protocol version 2 (HTTP/2) connection or an HTTP/3 connection. Additionally, or alternatively, the method 500 may include sending a stream of bytes from the application and to the secure access gateway via the first connection.

In some examples, the application may be a first application and/or the synthetic IP address may be a first synthetic IP address. Additionally, or alternatively, the method 500 may include receiving, from a second application executing on the device, a third request to access the target workload provisioned in the remote network domain. Additionally, or alternatively, the method 500 may include determining that the target workload indicated by the third request is associated with the policy rule. Additionally, or alternatively, the method 500 may include generating a second synthetic IP address associated with the target workload based at least in part on determining that the target workload is associated with the policy rule. Additionally, or alternatively, the method 500 may include storing a second mapping between the second synthetic IP address, the target workload, and the second application. Additionally, or alternatively, the method 500 may include receiving a fourth request to connect to the target workload from the second application, the fourth request indicating the second synthetic IP address. Additionally, or alternatively, the method 500 may include establishing a second connection between the second application and the secure access gateway associated with the target workload based at least in part on the second mapping.

Additionally, or alternatively, the method 500 may include determining a set of unassigned IP addresses. In some examples, generating the synthetic IP address may be based at least in part on randomly sampling from the set of unassigned IP addresses.

In some examples, the first connection between the application and the secure access gateway may be a tunneled connection. Additionally, or alternatively, the method 500 may include sending an indication of the first mapping from the device and to the secure access gateway. Additionally, or alternatively, the method 500 may include sending one or more IP packets to the secure access gateway via the tunneled connection, the one or more IP packets comprising the synthetic IP address.

FIG. 6 illustrates a flow diagram of an example method 600 for a device provisioned in a client network to configure a loopback listener to listen on a synthetic address and random port to receive authentication data for establishing a connection between an application executing on the device and a target workload provisioned in a remote network (e.g., an enterprise and/or private network). In some examples, the device, the application, the target workload, the client network, and/or the remote network may correspond to the client device 106, the application(s) 208, the target workload 110, the client network 108, and/or the enterprise network 112, as described with respect to FIGS. 1A and 2. Additionally, or alternatively, the loopback listener may correspond to the local listener 414, as described with respect to FIG. 4.

At 602, the method 600 may include receiving, at an application on a device, an authentication request to establish a connection between the application and a target workload.

At 604, the method 600 may include generating a random domain name associated with the device.

At 606, the method 600 may include generating a synthetic internet protocol (IP) address associated with the device.

At 608, the method 600 may include storing the synthetic IP address in association with the random domain name.

At 610, the method 600 may include causing a loopback listener on the device to listen on the synthetic address on a random port.

At 612, the method 600 may include invoking an external browser on the device in response to the authentication request, the external browser being redirected to the random domain name and the random port.

At 614, the method 600 may include receiving, by the loopback listener, authentication data associated with the authentication request to establish the connection between the application and the target workload.

Additionally, or alternatively, the method 600 may include receiving an input associated with the authentication request via the external browser. Additionally, or alternatively, the method 600 may include establishing the connection between the device and the target workload based at least in part on the input.

In some examples, the synthetic IP address may be one of a loopback address within a link-local address range or a unique local address within a discard prefix range.

In some examples, the synthetic IP address may be one of an IP version 4 (IPv4) or an IP version 6 (IPv6) address.

In some examples, the authentication request is received via an embedded browser associated with the application. Additionally, or alternatively, the method 600 may include generating an authentication token based at least in part on the authentication data. Additionally, or alternatively, the method 600 may include storing the authentication token. Additionally, or alternatively, the method 600 may include invoking the embedded browser to respond to the authentication request with the authentication token.

In some examples, the authentication request may be received from a secure access gateway associated with accessing the target workload and/or the connection May comprise a first connection between the application and the secure access gateway and/or a second connection between the secure access gateway and the target workload.

Figure 7:
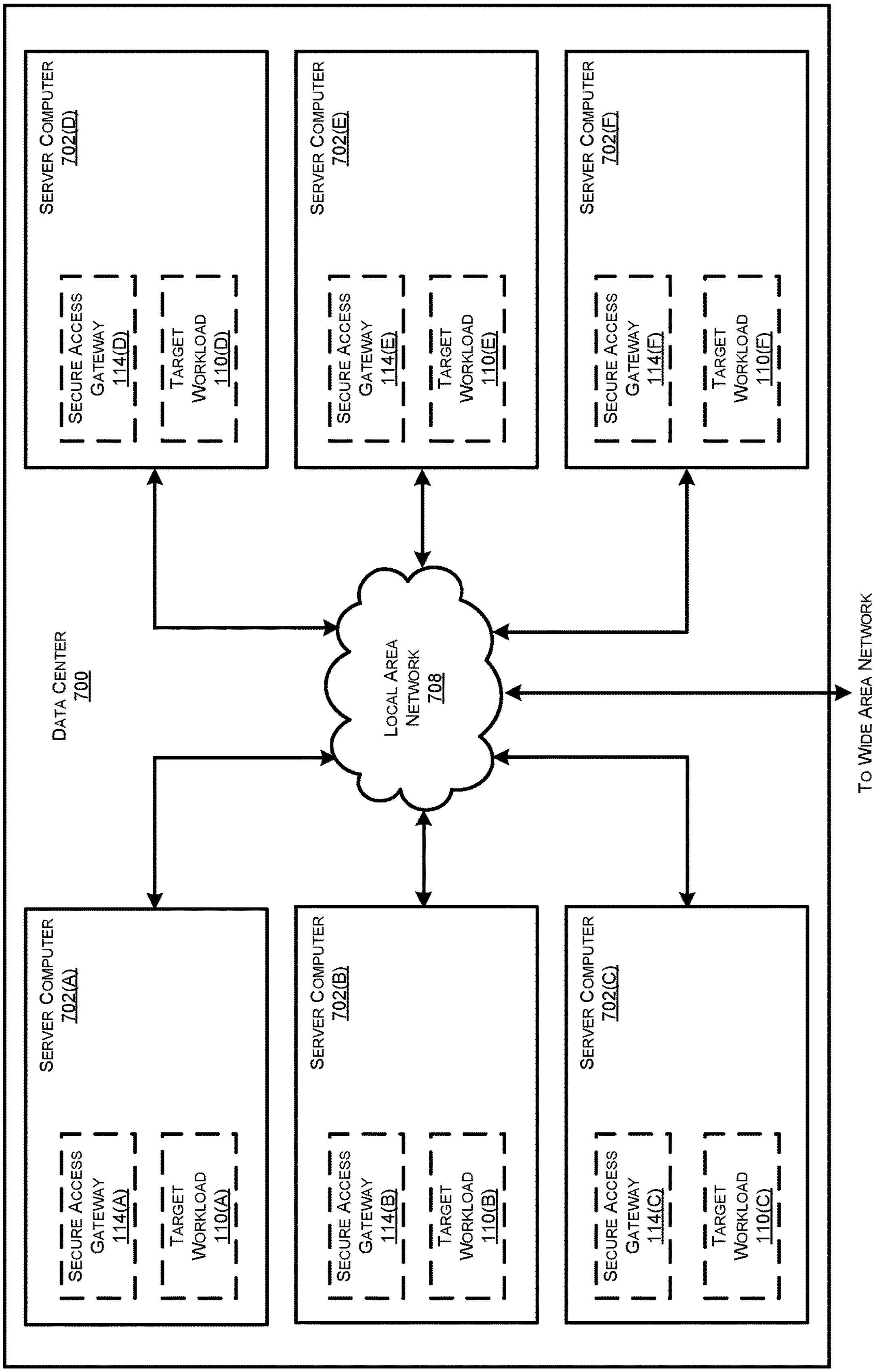
FIG. 7 illustrates a computing system diagram illustrating a configuration for a data center that can be utilized to implement aspects of the technologies disclosed herein.

FIG. 7 is a computing system diagram illustrating a configuration for a data center 700 that can be utilized to implement aspects of the technologies disclosed herein. The example data center 700 shown in FIG. 7 includes several server computers 702A-702E (which might be referred to herein singularly as "a server computer 702" or in the plural as "the server computers 702") for providing computing resources. In some examples, the server computers 702 may include, or correspond to, the servers associated with the site (or data center) 104 described herein with respect to FIGS. 1A and 2.

The server computers 702 can be standard tower, rack-mount, or blade server computers configured appropriately for providing the computing resources described herein. As mentioned above, the computing resources provided by the network 102 can be data processing resources such as VM instances or hardware computing systems, database clusters, computing clusters, storage clusters, data storage resources, database resources, networking resources, and others. Some of the servers 702 can also be configured to execute a resource manager capable of instantiating and/or managing the computing resources. In the case of VM instances, for example, the resource manager can be a hypervisor or another type of program configured to enable the execution of multiple VM instances on a single server computer 702. Server computers 702 in the data center 700 can also be configured to provide network services and other types of services.

In the example data center 700 shown in FIG. 7, an appropriate LAN 708 is also utilized to interconnect the server computers 702A-702E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the server computers 702A-702E in each data center 700, and, potentially, between computing resources in each of the server computers 702. It should be appreciated that the configuration of the data center 700 described with reference to FIG. 7 is merely illustrative and that other implementations can be utilized.

In some examples, the server computers 702 may each execute a secure access gateway 114, a target workload 110, and/or a KDF 210.

In some instances, the network 102, the client network 108, and/or the enterprise network 112 may provide computing resources, like application containers, VM instances, and storage, on a permanent or an as-needed basis. Among other types of functionality, the computing resources provided by the network 102, the client network 108, and/or the enterprise network 112 may be utilized to implement the various services described above. The computing resources provided by the network 102, the client network 108, and/or the enterprise network 112 can include various types of computing resources, such as data processing resources like application containers and VM instances, data storage resources, networking resources, data communication resources, network services, and the like.

Each type of computing resource provided by the network 102, the client network 108, and/or the enterprise network 112 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The network 102, the client network 108, and/or the enterprise network 112 can also be configured to provide other types of computing resources not mentioned specifically herein.

The computing resources provided by the network 102, the client network 108, and/or the enterprise network 112 may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations. One illustrative embodiment for a data center 700 that can be utilized to implement the technologies disclosed herein will be described below with regard to FIG. 8.

Figure 8:
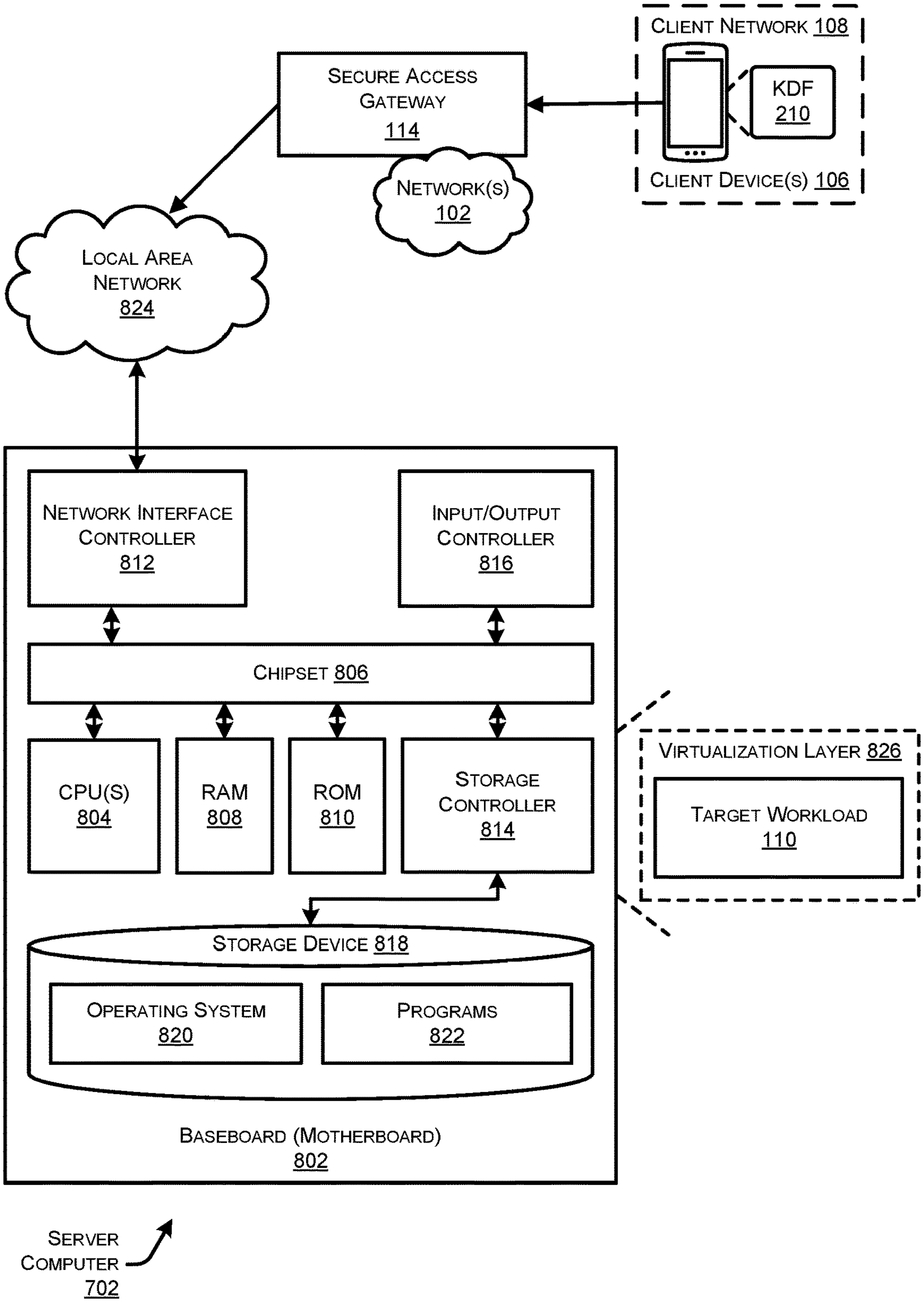
FIG. 8 is a computer architecture diagram showing an illustrative computer hardware architecture for implementing a server device that can be utilized to implement aspects of the various technologies presented herein.

FIG. 8 shows an example computer architecture for a computing device (or network routing device) 702 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein. The computing device 702 may, in some examples, correspond to a physical server of the data center(s) 104 described herein with respect to FIGS. 1A and 2.

The computing device 702 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computing device 702.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computing device 702. The chipset 806 can further provide an interface to a computer-readable storage medium such as a read-only memory ("ROM") 810 or non-volatile RAM ("NVRAM") for storing basic routines that help to startup the computing device 702 and to transfer information between the various components and devices. The ROM 810 or NVRAM can also store other software components necessary for the operation of the computing device 702 in accordance with the configurations described herein.

The computing device 702 can operate in a networked environment using logical connections to remote computing devices and computer systems through a network, such as the network 824 (or 708). The chipset 806 can include functionality for providing network connectivity through a NIC 812, such as a gigabit Ethernet adapter. The NIC 812 is capable of connecting the computing device 702 to other computing devices over the network 824. It should be appreciated that multiple NICs 812 can be present in the computing device 702, connecting the computer to other types of networks and remote computer systems.

The computing device 702 can be connected to a storage device 818 that provides non-volatile storage for the computing device 702. The storage device 818 can store an operating system 820, programs 822, and data, which have been described in greater detail herein. The storage device 818 can be connected to the computing device 702 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 702 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computing device 702 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 702 can further read information from the storage device 818 by detecting the physical states or characteristics of one or more particular locations within the physical storage units.

In addition to the mass storage device 818 described above, the computing device 702 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 702. In some examples, the operations performed by the network 102, the client network 108, and/or the enterprise network 112, and or any components included therein, may be supported by one or more devices similar to computing device 702. Stated otherwise, some or all of the operations performed by the network 102, and or any components included therein, may be performed by one or more computing device 702 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computing device 702. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computing device 702.

In one embodiment, the storage device 818 or other computer-readable storage media is encoded with computer-executable instructions which, when loaded into the computing device 702, transform the computer from a general-purpose computing system into a special-purpose computer capable of implementing the embodiments described herein. These computer-executable instructions transform the computing device 702 by specifying how the CPUs 804 transition between states, as described above. According to one embodiment, the computing device 702 has access to computer-readable storage media storing computer-executable instructions which, when executed by the computing device 702, perform the various processes described above with regard to FIGS. 3-6 The computing device 702 can also include computer-readable storage media having instructions stored thereupon for performing any of the other computer-implemented operations described herein.

The computing device 702 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computing device 702 might not include all of the components shown in FIG. 8, can include other components that are not explicitly shown in FIG. 8, or might utilize an architecture completely different than that shown in FIG. 8.

The server computer 702 may support a virtualization layer 826, such as one or more components associated with the network 102, the client network 108, and/or the enterprise network 112 such as, for example, the secure access gateway 114, the KDF 210, and/or the target workload 110 as described with respect to FIGS. 1A and 2. In some examples, a client device 106 configured with the KDF 210 may establish a connection to the target workload 110 via a secure access gateway 114 using a synthetic (e.g., non-routable) IP address according to the various techniques described herein. Additionally, or alternatively, a client device 106 configured with the KDF 210 may receive authentication data via a local listener configured on a synthetic IP address using a random port.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

receiving, from an application executing on a device in a first network domain, a first request to access a target workload provisioned in a second network domain;

determining a network policy associated with the second network domain;

identifying, based at least in part on the network policy, a policy rule associated with accessing the target workload provisioned in the second network domain;

determining, based at least in part on identifying the policy rule, that the target workload indicated by the first request is associated with the policy rule;

generating a synthetic internet protocol (IP) address associated with the target workload based at least in part on determining that the target workload is associated with the policy rule;

storing a first mapping between the synthetic IP address and the target workload;

receiving a second request to connect to the target workload from the application, the second request indicating the synthetic IP address; and establishing a first connection between the application and a secure access gateway associated with the target workload based at least in part on the first mapping between the synthetic IP address and the target workload.

2. The method of claim 1, wherein the synthetic IP address is randomly generated.

3. The method of claim 1, wherein the synthetic IP address is one of a loopback address within a link-local address range or a unique local address within a discard prefix range.

4. The method of claim 1, wherein the first request is a domain name system (DNS) request and the second request indicates a request to connect to a resolved address, and the method further comprising:

sending, to the application and in response to the DNS request, a synthesized DNS response, the synthesized DNS response indicating the synthetic IP address as the resolved address.

5. The method of claim 1, wherein the synthetic IP address is a first synthetic IP address, and the method further comprising:

receiving, from the secure access gateway, a third request to authenticate the first request to access the target workload;

generating a random domain name associated with the device;

generating a second synthetic IP address associated with the device;

storing a second mapping between the second synthetic IP address and the random domain name;

causing a loopback listener on the device to listen on the second synthetic IP address on a random port;

invoking an external browser on the device in response to the third request, the external browser being redirected to the random domain name and the random port; and receiving, by the loopback listener, authentication data associated with the third request to authenticate the first request to access the target workload.

6. The method of claim 1, wherein the second network domain is associated with an enterprise.

7. The method of claim 1, wherein the first mapping comprises a fully qualified domain name (FQDN) mapping indicating a domain name of the target workload.

8. A device comprising:

one or more processors; and one or more non-transitory computer-readable media storing computer-executable instructions that, when executed by the one or more processors, cause the one or more processors to perform operations comprising:

receiving, from an application executing on the device, a first request to access a target workload provisioned in a remote network domain;

determining a network policy associated with the remote network domain;

identifying, based at least in part on the network policy, a policy rule associated with accessing the target workload provisioned in the remote network domain;

determining, based at least in part on identifying the policy rule, that the target workload indicated by the first request is associated with the policy rule;

generating a synthetic internet protocol (IP) address associated with the target workload based at least in part on determining that the target workload is associated with the policy rule;

storing a first mapping between the synthetic IP address and the target workload;

receiving a second request to connect to the target workload from the application, the second request indicating the synthetic IP address; and establishing a first connection between the application and a secure access gateway associated with the target workload based at least in part on the first mapping between the synthetic IP address and the target workload.

9. The device of claim 8, wherein the synthetic IP address is one of an IP version 4 (IPv4) or an IP version 6 (IPv6) address.

10. The device of claim 8, wherein establishing the first connection between the application and the secure access gateway is further based at least in part on a random port associated with the device.

11. The device of claim 8, wherein the first connection between the application and the secure access gateway comprises one of a hypertext transfer protocol version 2 (HTTP/2) connection or an HTTP/3 connection, and the operations further comprising sending a stream of bytes from the application and to the secure access gateway via the first connection.

12. The device of claim 8, wherein the application is a first application, the synthetic IP address is a first synthetic IP address, and the operations further comprising:

receiving, from a second application executing on the device, a third request to access the target workload provisioned in the remote network domain;

determining that the target workload indicated by the third request is associated with the policy rule;

generating a second synthetic IP address associated with the target workload based at least in part on determining that the target workload is associated with the policy rule;

storing a second mapping between the second synthetic IP address, the target workload, and the second application;

receiving a fourth request to connect to the target workload from the second application, the fourth request indicating the second synthetic IP address; and establishing a second connection between the second application and the secure access gateway associated with the target workload based at least in part on the second mapping.

13. The device of claim 8, the operations further comprising determining a set of unassigned IP addresses, and wherein generating the synthetic IP address is based at least in part on randomly sampling from the set of unassigned IP addresses.

14. The device of claim 8, wherein the first connection between the application and the secure access gateway is a tunneled connection, and the operations further comprising:

sending an indication of the first mapping from the device and to the secure access gateway; and sending one or more IP packets to the secure access gateway via the tunneled connection, the one or more IP packets comprising the synthetic IP address.

15. A method comprising:

receiving, at an application on a device, an authentication request to establish a connection between the application and a target workload;

generating a random domain name associated with the device;

generating a synthetic internet protocol (IP) address associated with the device, wherein the synthetic IP address is non-routable on the client device;

storing the synthetic IP address in association with the random domain name;

causing a loopback listener on the device to listen on the synthetic IP address on a random port;

invoking an external browser on the device in response to the authentication request, the external browser being redirected to the random domain name and the random port; and receiving, by the loopback listener, authentication data associated with the authentication request to establish the connection between the application and the target workload.

16. The method of claim 15, further comprising:

receiving an input associated with the authentication request via the external browser; and establishing the connection between the device and the target workload based at least in part on the input.

17. The method of claim 15, wherein the synthetic IP address is one of a loopback address within a link-local address range or a unique local address within a discard prefix range.

18. The method of claim 15, wherein the synthetic IP address is one of an IP version 4 (IPv4) or an IP version 6 (IPv6) address.

19. The method of claim 15, wherein the authentication request is received via an embedded browser associated with the application, and the method further comprising:

generating an authentication token based at least in part on the authentication data;

storing the authentication token; and invoking the embedded browser to respond to the authentication request with the authentication token.

20. The method of claim 15, wherein the authentication request is received from a secure access gateway associated with accessing the target workload and the connection comprises a first connection between the application and the secure access gateway and a second connection between the secure access gateway and the target workload.

* * * * *